United States Patent [19]

Brackoneski et al.

[11] Patent Number: 5,580,183
[45] Date of Patent: Dec. 3, 1996

[54] GAS TURBINE ENGINE SPLINE ARRANGEMENT

[75] Inventors: Russell F. Brackoneski, Enfield; Dennis F. Buono, Manchester; John P. Abrahamian, Tolland, all of Conn.

[73] Assignee: United Technologies Corporation, Hartford, Conn.

[21] Appl. No.: 235,606

[22] Filed: Apr. 29, 1994

[51] Int. Cl.⁶ .................................................. F16D 1/00
[52] U.S. Cl. ............................ 403/359; 403/24; 415/216.1
[58] Field of Search ................................... 403/359, 298, 403/24, 25; 415/216.1

[56] References Cited

U.S. PATENT DOCUMENTS 3,393,533  7/1968  Wilkinson ........................ 403/359 X
3,900,270  8/1975  Rhodes ............................ 403/359 X
4,132,090  1/1979  McDermott .
4,704,096  11/1987 Marek ............................... 464/156
4,804,288  2/1989  Tiernan, Jr. ..................... 403/359 X Primary Examiner—Kenneth J. Dorner
Assistant Examiner—Harry C. Kim
Attorney, Agent, or Firm—Edward L. Kochey, Jr.

[57] ABSTRACT

A hollow drive shaft (20) with external splines (26) and drives a hollow driven shaft (14) which has internal splines (32). The driven shaft (14) thickness is uniformly tapered in the spline area, while the drive shaft (20) has a constant thickness through part of the spline area, and then a uniformly reducing thickness toward the unloaded end. The teeth of the external spline are crowned with the peak toward the loaded end of the drive spline (26). A flat is located at this peak.

2 Claims, 4 Drawing Sheets

GAS TURBINE ENGINE SPLINE ARRANGEMENT

TECHNICAL FIELD

The invention relates to splines for transferring load form a turbine drive shaft to a driven fan shaft, and in particular to a spline contour therefore.

BACKGROUND OF THE INVENTION

Spline connections are used to provide for the transfer of torque from one shaft to another. The splines have gear like teeth meshing the mating internal and external splines.

The loaded shafts twist experiencing angular displacement along the length. This occurs not only throughout the length of the shaft but also throughout the spline, with the twist of the shaft varying as the load is transferred to and from the particular shaft. Maldistribution of tooth load and stresses therefore occurs.

With straight teeth the load is predominantly at the end locations of the spline. High bearing stress and high tooth bending stresses are experienced. These high stresses reduce the low cycle fatigue life.

It is known to crown spline teeth with the crown located in the center, in order to achieve a more uniform load distribution.

SUMMARY OF THE INVENTION

A hollow turbine drive shaft has an external spline on one end of the shaft. A driven hollow fan shaft has an internal spline on one end. This internal spline meshes with the external spline and each shaft extends axially from this location where the splines intermesh. The driven shaft has an outside diameter tapering from a maximum at the loaded end to a minimum at the unloaded end. The hollow turbine drive shaft which has fabrication limitations on the inside diameter, has a minimum inside diameter at the loaded end uniform for a distance and thereafter tapering to a maximum inside diameter at the unloaded end.

The circumferentially facing surface of the teeth of the external spline have a curvature of the crown located on the loaded side of the center of the spline as contrasted to the actual center of the spline in the prior art.

DESCRIPTION OF THE PREFERRED EMBODIMENT

Figure 1:
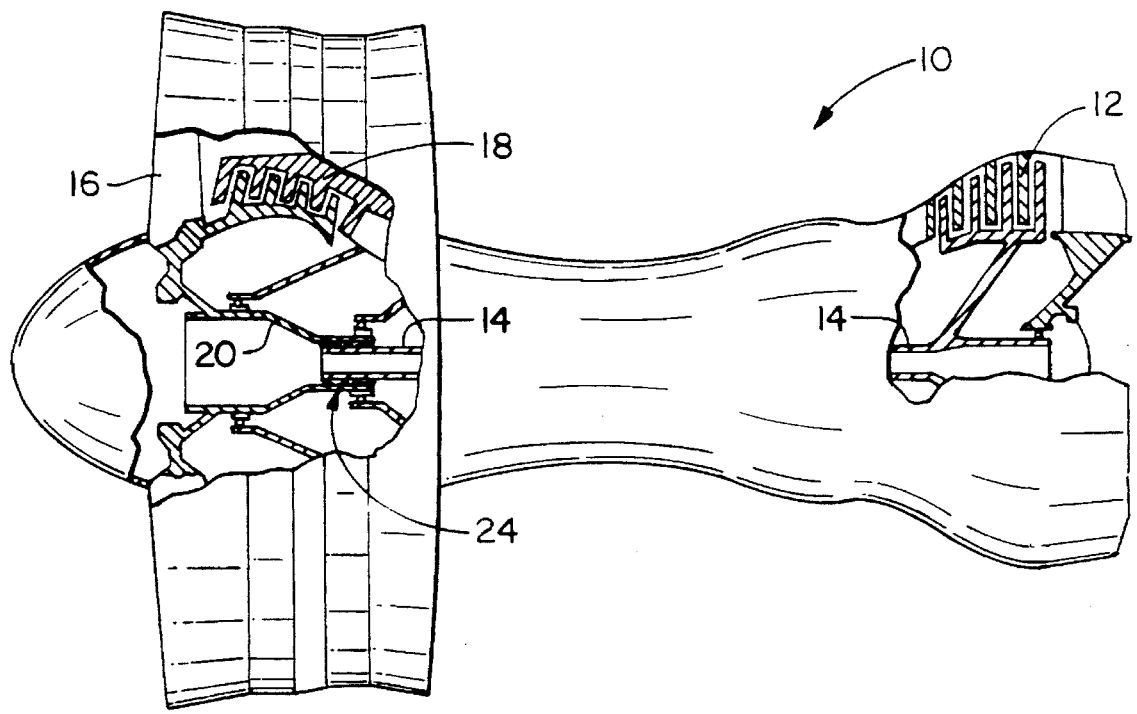
FIG. 1 is a schematic of a low pressure turbine driving a fan through a spline.
Figure 2:
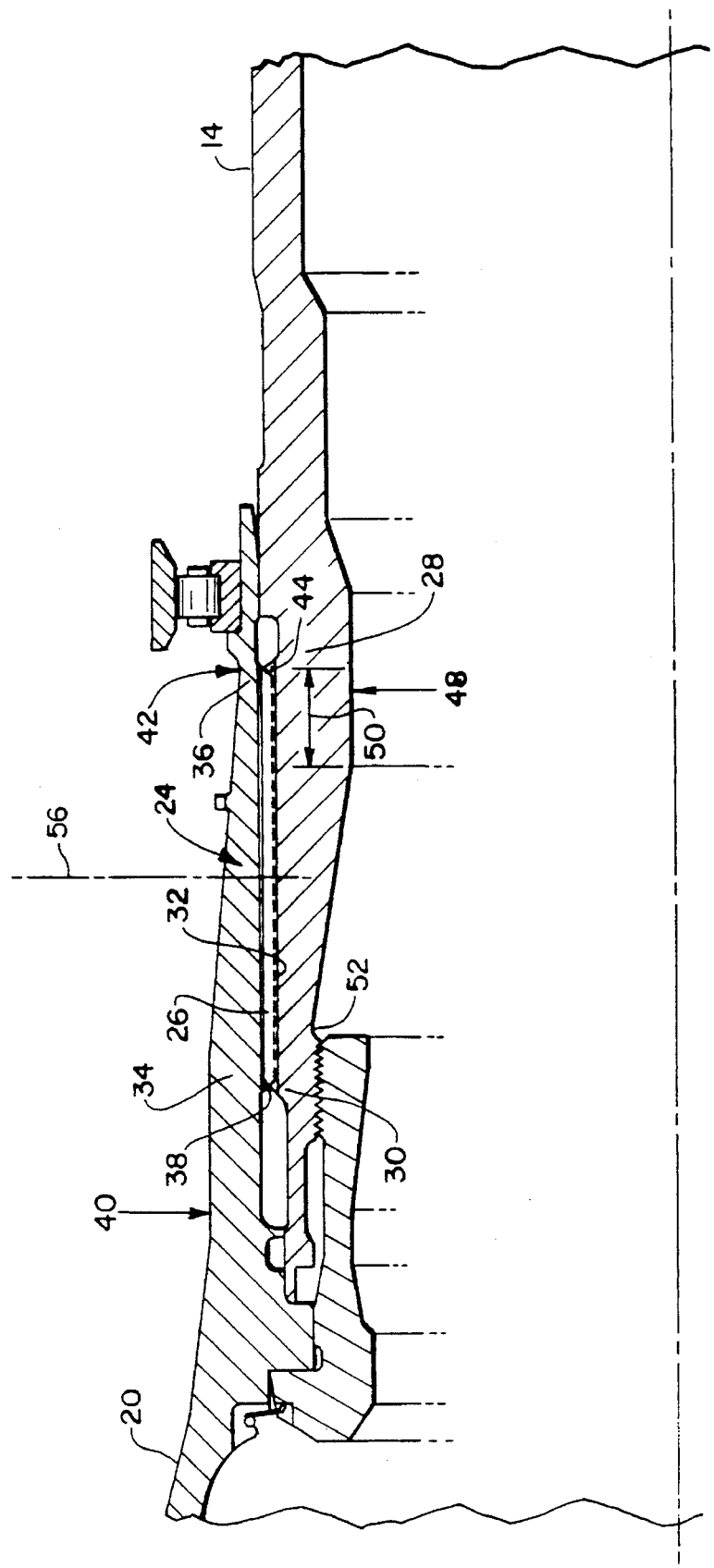
FIG. 2 is a detail of the spline area.

FIG. 1 shows a gas turbine engine 10 having a low pressure turbine 12 secured to a hollow low pressure turbine drive shaft 14. A fan 16 and low pressure compressor 18 are secured to a hollow driven fan shaft 20. The turbine drive shaft drives the driven fan shaft through the spline 24.

An external spline 26 is located on one end of the turbine drive shaft 14. This shaft has a loaded end 28 and an unloaded end 30 and this spline area.

An internal spline 32 is located on one end of the driven shaft 20 with the shaft having a loaded end 34 and an unloaded end 36 in the spline area. Each shaft extends in opposite loaded directions from the spline area 24.

Location 38 at the start of the spline on the driven shaft is a point of both stress concentration and high load. The outside diameter 40 of the driven fan shaft 20 can easily be made large enough to maintain an appropriate stress level despite the stress concentration. The outside diameter at the spline location tapers linearly to a minimum outside diameter 42 at the unloaded end. This is consistent with the shaft excepting load at a uniform rate along its length.

Location 44 on the drive shaft 14 is also a point of stress concentration with a highly loaded shaft. There is more difficulty in accommodating a stress concentration since reducing the inside diameter of the shaft is not as effective in reducing the outside diameter stress as the opposite approach used on the driven shaft. Because of the physical limitations on increasing the outside diameter this inside diameter is maintained at the same diameter 48 for a distance 50 from the loaded end and thereafter the inside diameter tapers uniformly to a maximum diameter 52 near the unloaded end.

Figure 3:
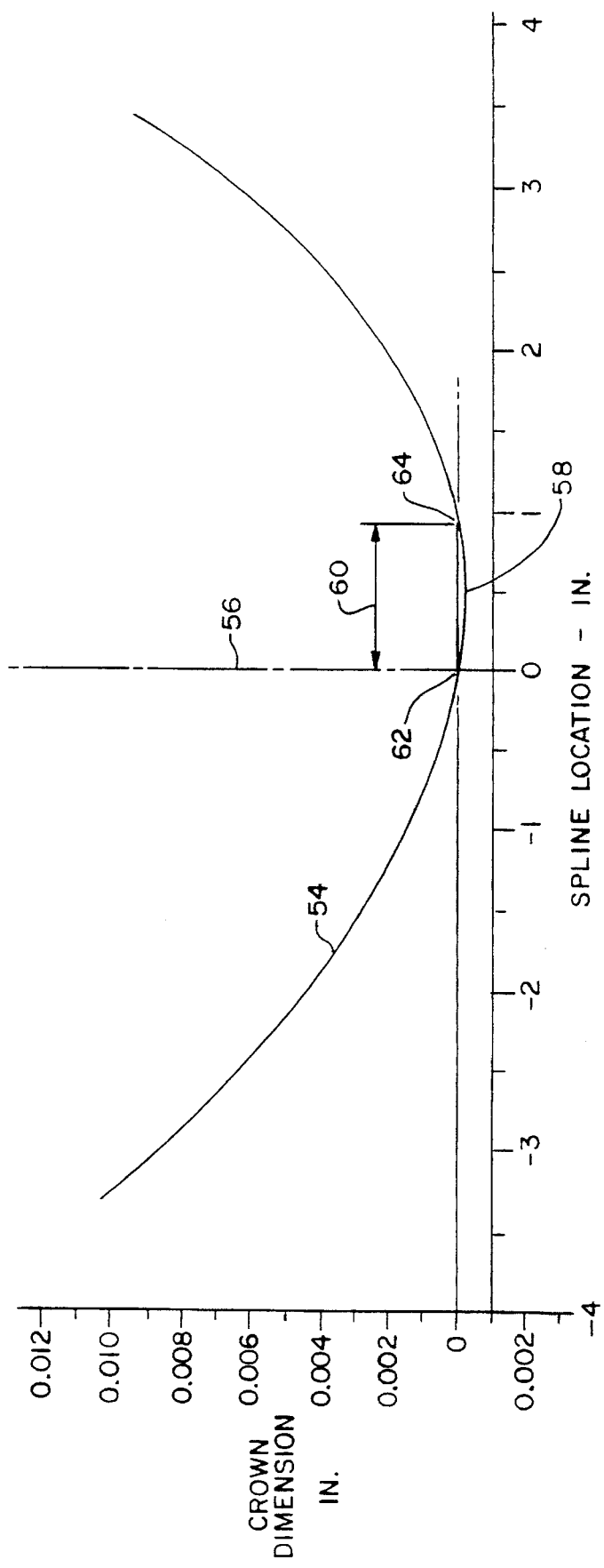
FIG. 3 is a curve showing the curvature of the spline surface.
Figure 4:
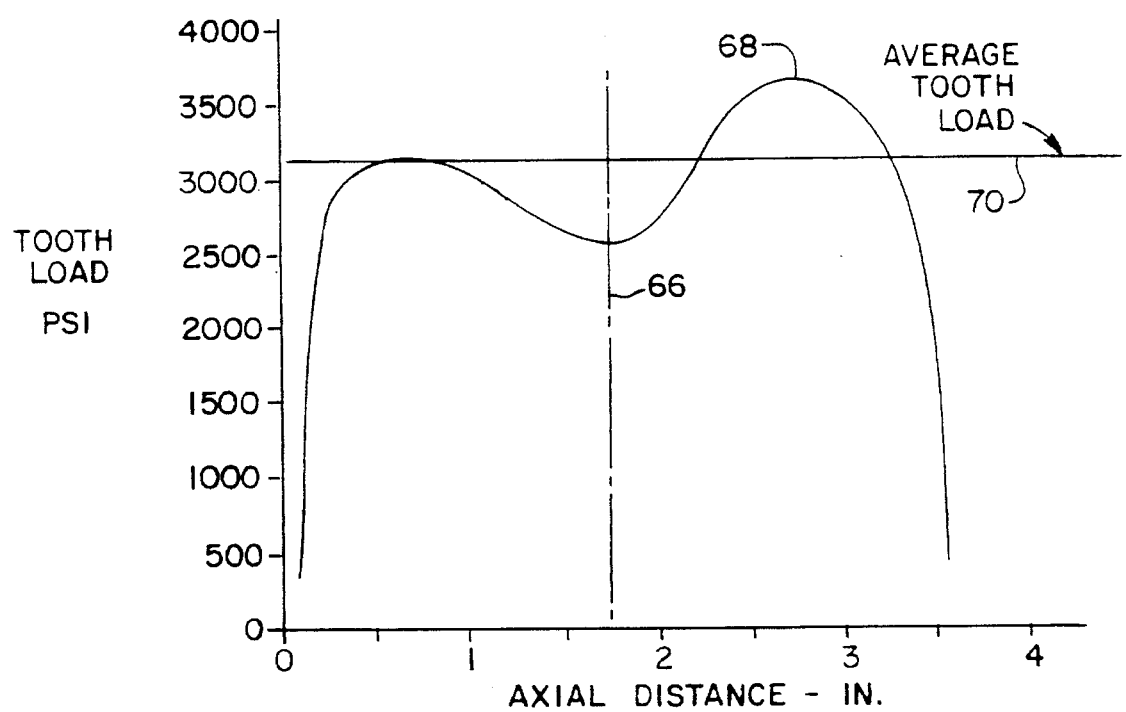
FIG. 4 is the prior art tooth load.

FIG. 3 shows the shape of the circumferentially facing surface of the external spline in the unloaded condition. This interfaces with the linear internal spline and provides a uniform load across the length of the spline. While the driven fan shaft 20 is tapered throughout its length, the drive shaft 14 has an increased stiff portion at the driven end. The curvature of the spline surface is shown by line 54 to an exaggerated scale with line 56 representing the center of the spline. It can be seen that the crown 58 of this curvature is one half inch off the center, this being in the direction toward the loaded end of the low pressure turbine drive shaft.

Also shown here is a distance 60 representing a flat between points 62 and 64. While this sacrifices some of the uniformity of stress, it facilitates measurement of the part during fabrication.

The prior art shape of the spline surface is a uniform curvature with the crown being at location 66 in the center. A flat is also used in the prior art to simplify measuring. The tooth load peaks at point 68 with the value of this calculation of about 3.6 thousand pound per square inch. This is contrasted to the average tooth load 70 of 3.1 thousand pounds per square inch.

Figure 5:
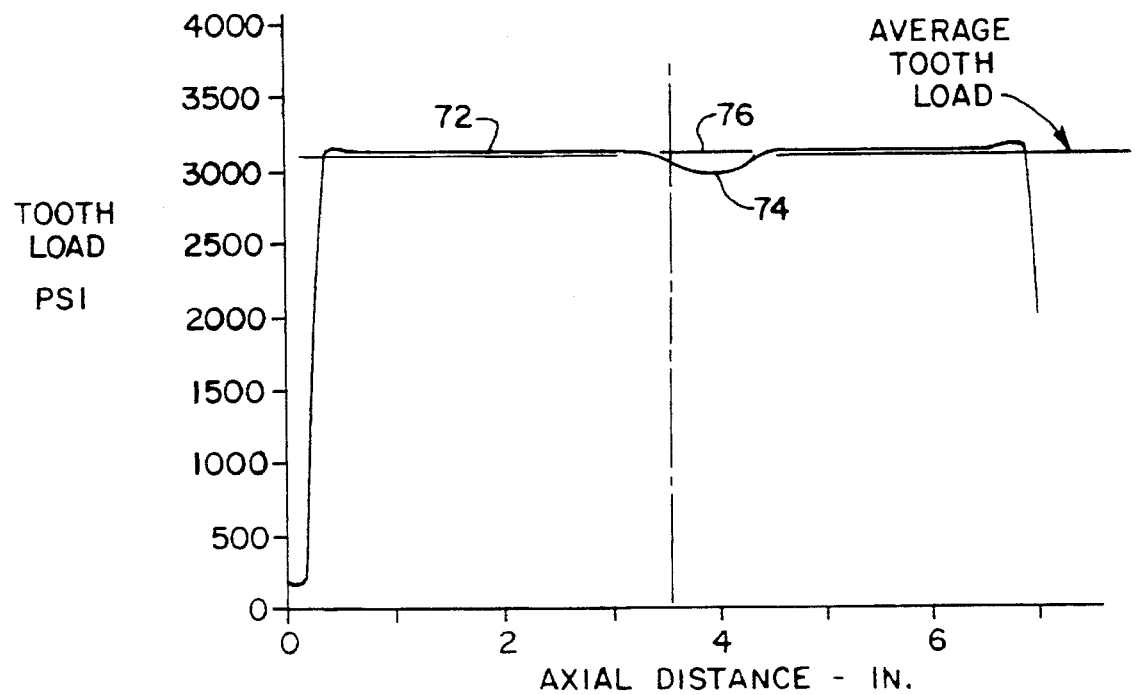
FIG. 5 is the tooth load with an offset crown and a flat at this offset location.

FIG. 5 illustrates the tooth load 72 in accordance with the described invention. The dip and stress 74 is a result of the flat added at the crown. In the absence of such a flat if the crown were to be maintained as curved then stress would stay at the constant level as indicated by line 76.

The peak stress here is about 3.15 thousand psi which is a reduction of 12.5% contrasted to the prior art.

We claim:

1. A gas turbine engine spline arrangement comprising:

a hollow turbine drive shaft; and an external spline on one end of said drive shaft, said external spline having teeth having circumferentially facing surface;

a hollow driven fan shaft;

an internal spline on one end of said driven shaft meshing with said external spline, and comprising a spline location where said splines meet, each said shaft extending axially from said splines in opposite loaded directions, whereby each said shaft has at said spline location a loaded end and an unloaded end;

said hollow driven fan shaft having an outside diameter at said spline location tapering from a maximum outside diameter at the loaded end to a minimum outside diameter at the unloaded end;

said hollow turbine drive shaft having a minimum inside diameter at said spline location, said inside diameter being uniform for a distance from the loaded end, and thereafter tapering to a maximum inside diameter at the unloaded end; and said circumferentially facing surface of said teeth of said external spline having a center and having a curvature and having a crown with said crown located on the loaded side of said center of said external spline.

2. A gas turbine engine spline arrangement as in claim 1 comprising also:

a flat, located at said crown, whereby measurement during fabrication is facilitated.

* * * * *

UNITED STATES PATENT AND TRADEMARK OFFICE
CERTIFICATE OF CORRECTION

PATENT NO. : 5,580,183

DATED : December 3, 1996

INVENTOR(S) : Russell F. Brackoneski, Dennis F. Buono, John P. Abrahamian

It is certified that error appears in the above-indentified patent and that said Letters Patent is hereby corrected as shown below:

IN THE ABSTRACT

Lines, 1, 2, 3 and 4, "shalt" should be "shaft", line 1, "(20)" should be "(14)", line 2, "(14)" should be "(20)", line 3 "(14)" should be "(20)" and line 4, "(20)" should be "(14)".

Signed and Sealed this

Eighth Day of July, 1997

Attest:

BRUCE LEHMAN

*Attesting Officer*  *Commissioner of Patents and Trademarks*